US008374651B2

(12) United States Patent
Onda et al.

(10) Patent No.: US 8,374,651 B2
(45) Date of Patent: Feb. 12, 2013

(54) SYSTEM AND METHOD FOR GENERATING A GRAPHICAL USER INTERFACE

(75) Inventors: Yasushi Onda, Tokyo (JP); Izua Kano, Yokohama (JP); Dai Kamiya, Tokyo (JP); Keiichi Murakami, Ichikawa (JP); Eiju Yamada, Yokohama (JP); Kazuhiro Yamada, Yokohama (JP)

(73) Assignee: NTT DoCoMo, Inc., Tokyo (JP)

(*) Notice: Subject to any disclaimer, the term of this patent is extended or adjusted under 35 U.S.C. 154(b) by 936 days.

(21) Appl. No.: 12/056,334

(22) Filed: Mar. 27, 2008

(65) Prior Publication Data

US 2008/0242363 A1 Oct. 2, 2008

(30) Foreign Application Priority Data

Mar. 29, 2007 (JP) .................................. 2007-087059

(51) Int. Cl.
*H04W 4/00* (2009.01)
*H04M 1/00* (2006.01)
(52) U.S. Cl. ...................... 455/566; 455/550.1; 455/466
(58) Field of Classification Search ............... 455/414.1, 455/415, 418, 550.1, 466, 566
See application file for complete search history.

(56) References Cited

U.S. PATENT DOCUMENTS

| 5,946,647 | A | 8/1999 | Miller et al. |
| 7,606,599 | B2 * | 10/2009 | Wakasa et al. ................. 455/566 |
| 7,835,504 | B1 * | 11/2010 | Donald et al. ............. 379/88.11 |
| 2002/0028697 | A1 * | 3/2002 | Davies .......................... 455/566 |
| 2002/0128036 | A1 | 9/2002 | Yach et al. |
| 2008/0009299 | A1 * | 1/2008 | Ryu ............................... 455/466 |
| 2008/0242361 | A1 * | 10/2008 | Onda et al. ...................... 455/566 |
| 2010/0064210 | A1 * | 3/2010 | Lekutai ........................ 715/261 |

FOREIGN PATENT DOCUMENTS

| JP | 06-046398 | 6/1994 |
| JP | 08-095924 | 4/1996 |
| JP | 09-146892 | 6/1997 |
| JP | 2000207309 | 7/2000 |
| JP | 2001-268206 | 9/2001 |
| JP | 2005-027063 | 1/2005 |
| JP | 2005352730 | 12/2005 |
| WO | 0154380 | 7/2001 |
| WO | 0154380 A2 | 7/2001 |

(Continued)

OTHER PUBLICATIONS

European Office Action for EP 08006061.9-1238, dated Dec. 30, 2008.

(Continued)

*Primary Examiner* — Andrew Wendell
(74) *Attorney, Agent, or Firm* — MKG, LLC

(57) ABSTRACT

A communications terminal comprises a display, a first storage for storing data, a second storage unit that stores a first and a second information set, the first information set including a first communications address and a communications recipient's name, and the second information set includes a second communications address and a communications recipient's name, a first display controller displays a text string expressed by data stored in the first storage unit; and a second display controller that identifies a name from the second storage unit included in the text string being displayed. When the name is associated with the first communications address, a screen prompts communications to the first communications address, or when the name is associated with the second communications address, a screen prompts communications to the second communications address.

4 Claims, 11 Drawing Sheets

FOREIGN PATENT DOCUMENTS

WO 03098425 11/2003

OTHER PUBLICATIONS

Japanese Office Action for JP 2007-087059, dated Dec. 14, 2010; with full English translation.

Chinese Office Action for CN200810088368.2 dated Aug. 19, 2010.
Full English translation for Chinese Office Action (CN200810088368.2) dated Aug. 19, 2010.

\* cited by examiner

FIG. 3

| INDEX | TELEPHONE NUMBER | EMAIL ADDRESS | ADDRESS | BIRTHDAY | GROUP | STILL IMAGE |
|---|---|---|---|---|---|---|
| TARO YOSHIDA | 090********* | --@abc.ne.jp | MINATO-KU, TOKYO... | 1970/1/1 | FRIENDS | JIF001 |
| BUSINESS A | 03********* | --@abc.ne.jp | SHIBUYA-KU, TOKYO... | — | BUSINESS ASSOCIATES | — |
| ⋮ | ⋮ | ⋮ | ⋮ | ⋮ | ⋮ | ⋮ |
| ⋮ | ⋮ | ⋮ | ⋮ | ⋮ | ⋮ | ⋮ |
| ⋮ | ⋮ | ⋮ | ⋮ | ⋮ | ⋮ | ⋮ |

| ACTIVITY CONTENTS | DATE | PRIORITY LEVEL | CATEGORY | ALARM NOTIFICATION |
|---|---|---|---|---|
| INQUIRE TO BUSINESS A ABOUT XX. SEND EMAIL TO DEPT. YY | 2006/9/1 | HIGH | WORK | UNNECESSARY |
| TRIP TO XX WITH TARO YOSHIDA. CONTACT BY PHONE BY THE DAY BEFORE AND CONFIRM MEETING PLACE | 2006/9/11 /10:00 | LOW | PRIVATE | NECESSARY |
| ... | ... | ... | ... | ... |
| ... | ... | ... | ... | ... |
| ... | ... | ... | ... | ... |

SYSTEM AND METHOD FOR GENERATING A GRAPHICAL USER INTERFACE

CROSS-REFERENCE TO RELATED APPLICATIONS

This application is based on and claims priority under 35 USC 119 from Japanese Patent Application No. 2007-087059 filed on Mar. 29, 2007.

BACKGROUND

1. Technical Field

The present invention relates to a graphical user interface.

2. Related Art

As is widely known, in portable telephones, in addition to an application that governs communications service via voice telephone calls, application programs are implemented that govern other communications services, such as sending and receiving email, site browsing, and the like. Tests have been conducted in which a highly-convenient service is provided by linking these application programs together. Various technologies that support such tests have been proposed. For example, in a portable telephone disclosed in JP 2001-268206A, when a user selects a desired character string written in an email that has been received, a message is displayed that prompts the user to register that character string grouped with a telephone number in a phonebook memory, or to place a phone call to a telephone number registered in the phonebook memory in association with that character string.

To Do application programs are used in portable telephones and have little direct relationship with communication services. With this type of program, the user registers a planned activity or the like in association with the time and date of the planned activity. When the registered time and date arrives, the user is notified of that fact via an alarm and/or various types of display indicators.

It is often the case that the user who uses this To Do application program registers as an activity that an email should be sent or a telephone call should be made, for example in the manner of "Contact Mr. XX by email by <month><day>", or "Contact Mrs. YY by telephone at <time><month><day>". However, when the user that performed such a registration has received the notice that the registered time and date has arrived, the user is forced to perform the time consuming and sometimes tedious operation of inputting the telephone number or the email address of the recipient, character by character, or searching for the telephone number or email address in the memory of an address book.

SUMMARY

It is one object of the present invention to provide a mechanism in which text created with, for example, a To Do application or the like, is linked with communications performed by a communications terminal, so that user convenience can be improved.

In an aspect of the invention, there is provided a communications terminal comprising: a display; a first storage unit that stores data including a text string; a second storage unit that stores a first information set and a second information set, the first information set including a first communications address and a name of a communications recipient indicated in the first communications address, and the second information set including a second communications address and a name of a communications recipient indicated in the second communications address; a first display controller that displays, on the display, a text string expressed by data stored in the first storage unit; and a second display controller that, among names stored in the second storage unit, identifies a name included in the text string displayed by the first display controller, and when the identified name is associated with the first communications address, the controller displays on the display a screen prompting communications to the first communications address, or when the identified name is associated with the second communications address, displays a screen prompting communications to the second communications address.

In another aspect of the invention, when the identified name is associated with both the first communications address and the second communications address, the second display controller determines whether the text string displayed by the first display controller includes a first related text string or a second related text string, the first and second related text strings being words representative of communications performed by the first and communications address, respectively; and when the first related text string is included, the second display controller displays a screen prompting communications using the first communications address, and when the second related text string is included, the second display controller displays a screen prompting communications using the second communications address.

In yet another aspect of the invention, an input unit is provided, wherein: the second display controller changes an appearance of the identified name being displayed, so as to notify a link to the first communications address or the second communications address; and when the displayed name which the appearance is changed is selected via the input unit, the second display controller displays on the display a screen prompting communications using the first communications address or displays a screen prompting communications using the second communications address, respectively.

The first communications address may be a telephone number, and the second communications address may be an email address In yet another aspect of the invention, there is provided a computer program product that causes a computer to execute specified steps. The computer includes a display, a first storage unit that stores data that includes a text string, and a second storage unit that stores first and second sets of information, the first set of information including a first communications address and a name of a communications recipient indicated by the first communications address, and the second set of information including a second communications address and a name of a communications recipient indicated by the second communications address. The specified steps include, displaying, on the display, a text string expressed by data stored in the first storage unit; identifying from among names stored in the second storage unit a name included in the displayed text string; and when the identified name is associated with the first communications address, displaying on the display a screen prompting communications to the first communications address, or when the identified name is associated with the second communications address, displaying a screen prompting communications to the second communications address.

In yet another aspect of the invention, there is provided a computer readable storing medium that stores the computer program product.

According to an aspect of the invention, it is possible to provide a mechanism in which a To Do application program and an application program that governs a communications service are preferably linked, so that convenience for a user can be further improved.

BRIEF DESCRIPTION OF THE DRAWINGS

Exemplary embodiments of the present invention will be described in detail based on the following figures, wherein:

FIG. 3 shows the data structure of a table of a telephone book data storage area;

DETAILED DESCRIPTION

Figure 1:
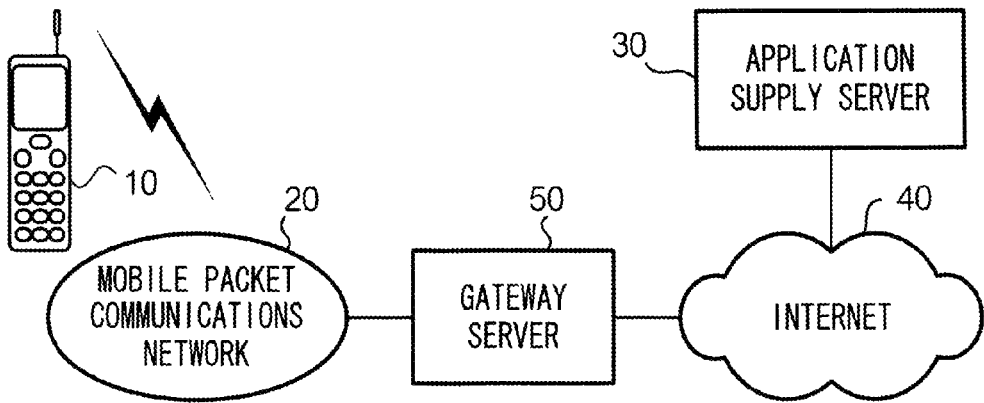
FIG. 1 shows the overall configuration of an exemplary embodiment.

FIG. 1 shows the overall configuration of a communications system according to this exemplary embodiment. As shown in FIG. 1, this system is configured from a mobile packet communications network 20 to which a mobile terminal 10 is connected, an Internet 40 to which an application supply server 30 is connected, and a gateway server 50 interposed between those communications networks.

The mobile packet communications network 20 is a collection of nodes where data is sent with a procedure compliant with a protocol in which TCP (transmission control protocol)/IP (internet protocol) is simplified, a protocol corresponding to HTTP (hyper text transfer protocol) realized with TCP/IP, or the like, and includes a base station and a packet subscriber processing apparatus. On the other hand, the Internet 40 is a collection of nodes where data is sent with a procedure compliant with TCP/IP, HTTP realized with TCP/IP, SMTP (simple mail transfer protocol), or the like, and includes a server and a router.

The gateway server 50 is a computer that operates in a moving packet gateway relay exchange station where the mobile packet communications network 20 and the Internet 40 are connected to each other. The gateway server 50 performs protocol conversion on data that has been sent from a node of one of the communications networks to a node of the other communications network, and then forwards that data to the node of the other communications network.

Figure 2:
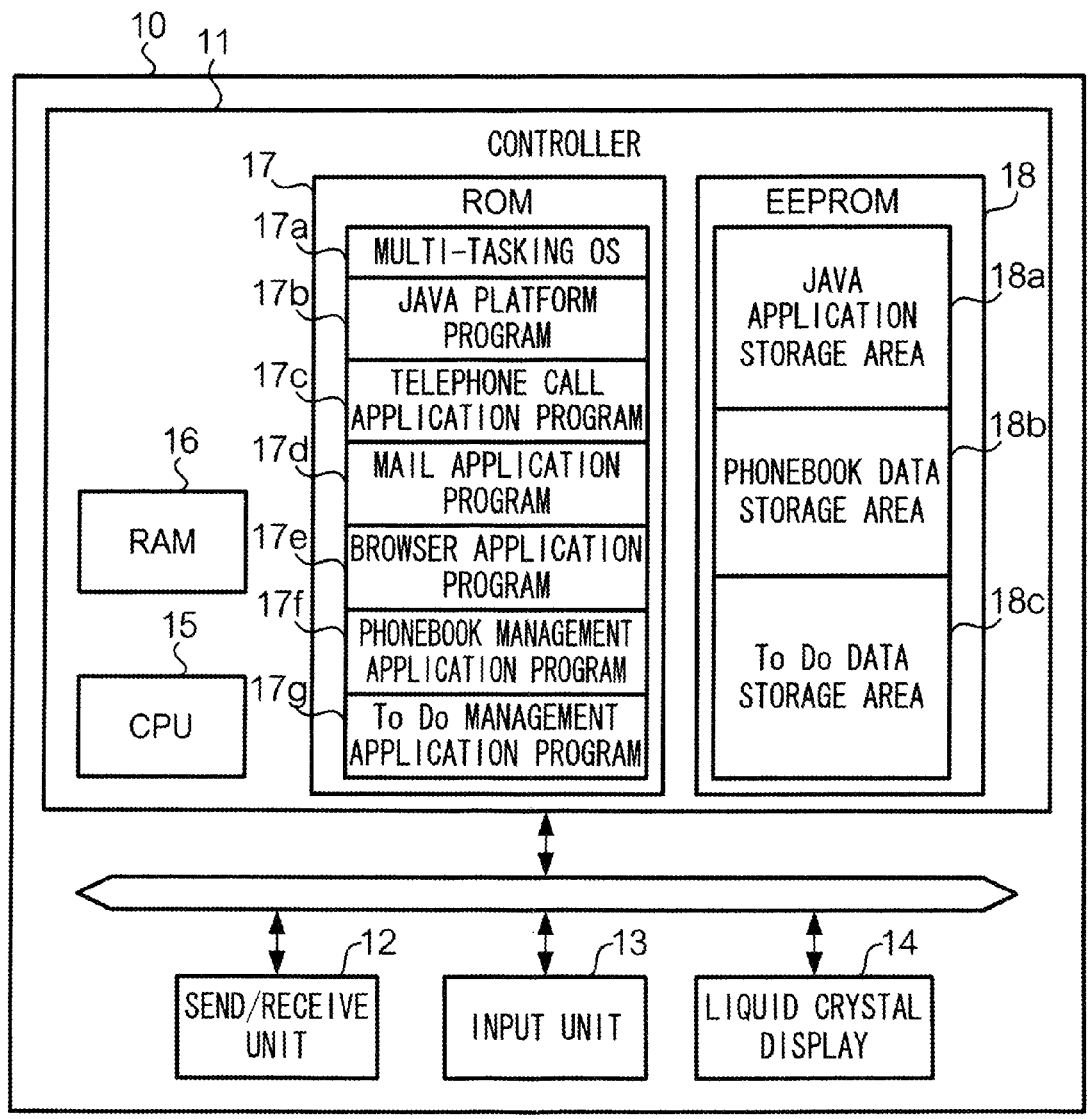
FIG. 2 shows the physical configuration of a mobile terminal.

FIG. 2 shows the physical configuration of the mobile terminal 10. The mobile terminal 10 is provided with a controller 11, a send/receive unit 12, an input unit 13, and a liquid crystal display 14.

The send/receive unit 12 performs wireless communications with the base station of the mobile packet communications network 20, under control by the controller 11.

The input unit 13 is configured with various buttons and cursor keys such as PBs (push buttons), and when an input operation is performed by a user, an operation signal corresponding to that input operation is supplied to the controller 11. The liquid crystal display 14 is configured from a display apparatus such as a liquid crystal panel, and displays various information under control by the controller 11.

The controller 11 includes a CPU 15, a RAM 16, a ROM 17, and an EEPROM 18.

The CPU 15 executes various programs that have been stored in the ROM 17 or the EEPROM 18, using the RAM 16 as a work area.

Pre-installed programs are stored in the ROM 17. The pre-installed programs are programs stored in the ROM 17 in the course of manufacturing the mobile terminal 10, and specifically are each of a multi-tasking operating system (referred to below as a "multi-tasking OS") 17a, a Java (registered trademark) platform program 17b, a telephone call application program 17c, a mail application program 17d, a browser application program 17e, a phonebook management application program 17f, and a To Do management application program 17g.

As a general description of these programs, first, the multi-tasking OS 17a is an operating system that supports various functions necessary for executing simulated parallel execution of multiple tasks with a TSS (Time-Sharing System), such as allocation to virtual memory spaces. The Java platform program 17b is a group of programs written according to a CDC (Connected Device Configuration). When the Java platform program 17b is started up, a Java runtime environment is realized that includes class libraries, a JVM (Java Virtual Machine), and a JAM (Java Application Manager).

The telephone call application program 17c governs functions such as making and receiving telephone calls, and exchange of voice signals.

The mail application program 17d governs functions such as editing, sending, and receiving of email.

The browser application program 17e governs functions such as receiving and interpretation of data written in HTML (Hyper Text Markup Language) format.

The phonebook management application program 17f governs management of personal information of other individuals, such as the recipient of a telephone call or an email address. The personal information managed by this program includes, for example, other than telephone numbers and email addresses, addresses, birthdays, groups, and still images displayed on the liquid crystal display 14 when there is an incoming call. When a user newly registers personal information, the user displays a phonebook registration screen on the liquid crystal display 14 by operating the input unit 13, and from this screen, the user inputs the various information described above, and a name (such as "Taro Yoshida" or "Business A") is used as an index of that information. In this phonebook registration screen, registration of at least a telephone number or an email address is necessary, but registration of other information is optional. Also, when the user wants to browse the registered personal information, the user displays a phonebook browsing screen on the liquid crystal display 14 by operating the input unit 13, and from this screen, the user causes the display content of the liquid crystal display 14 to transition to desired personal information using the index as a key. Further, by selecting a telephone number included in the displayed personal information while that telephone number is displayed in a highlighted manner, a telephone call can be placed to that telephone number, or, by selecting an email address while that email address is displayed in a highlighted manner, an email can be sent to that email address.

The To Do management application program 17g governs management of "To Do information", which is information that indicates activities the user plans to perform, and various attributes related to those activities. The To Do information managed by this program includes, in addition to text strings that describe the content of activities the user will perform and dates of those activities, priority levels of "high", "medium", "low", and the like, activity categories such as "private", "holiday", "travel", "work", and "meeting", and whether or not to perform alarm notification when a date has arrived. When a user newly registers To Do information, the user displays a To Do registration screen on the liquid crystal display 14 by operating the input unit 13, and from this screen, the user inputs the various information described above. Also, when a user browses registered To Do information, the user displays a To Do browsing screen on the liquid crystal display 14, and from this screen, the user causes the display content of the liquid crystal display 14 to transition to a To Do content confirmation screen of desired To Do information.

The EEPROM 18 has a Java application storage area 18a, a phonebook data storage area 18b, and a To Do data storage area 18c.

Java applications are stored in the Java application storage area 18a. A Java application has a Jar (Java Archive) file in which an actual program that describes a processing procedure under the Java runtime environment, and image files and audio files used when executing the actual program, are collected, and an ADF (Application Descriptor File) that describes installation, startup, and various attributes of that Jar file. This Java application is stored on a server of the Internet 40 or the like, and is appropriately downloaded from the server in response to a request from the mobile terminal 10.

Phonebook data produced by the phonebook management application program 17f is stored in a table in the phonebook data storage area 18b. FIG. 3 shows the data structure of this table.

As shown in FIG. 3, each record in the table formed in the phonebook data storage area 18b includes seven fields, namely "index", "telephone number", "email address", "address", "birthday", "group", and "still image". The various items of information input in the phonebook registration screen described above are respectively stored in these fields.

Figures 4, 5:
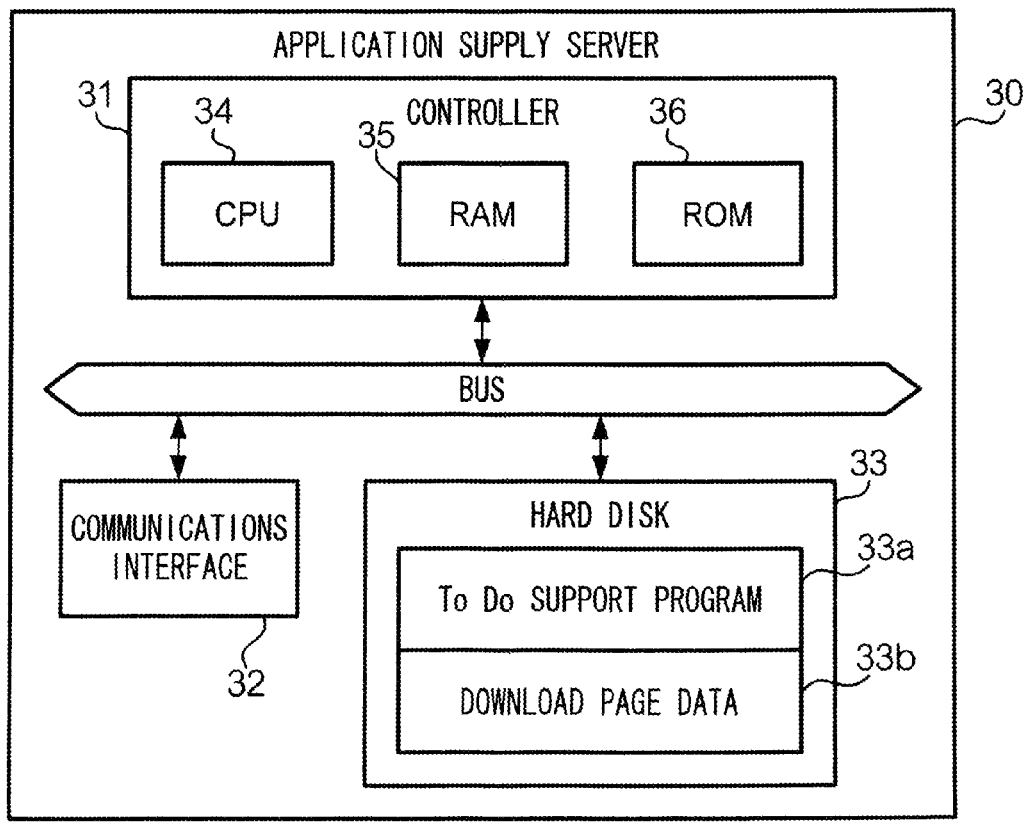
FIG. 4 shows the data structure of a table of a To Do data storage area.
FIG. 5 shows the schematic configuration of hardware of an application supply server.

To Do data produced by the To Do management application program 17g is stored in a table in the To Do data storage area 18c. FIG. 4 shows the data structure of this table.

As shown in FIG. 4, each record in the table formed in the To Do data storage area 18c has five fields, namely "activity content", "date", "priority level", "category", and "alarm notification". The various items of information input in the To Do registration screen described above are respectively stored in these fields.

FIG. 5 shows the schematic configuration of hardware of the application supply server 30. As shown in FIG. 5, the server 30 is provided with a controller 31, a communications interface 32, and a hard disk 33.

A CPU 34, a RAM 35, a ROM 36, and the like are built into the controller 31. The communications interface 32 governs exchange of data according to protocols such as TCP/IP and HTTP. A To Do support program 33a and a download page data 33b are stored on the hard disk 33.

The To Do support program 33a is one Java application program programmed by operators of the application supply server 30. The To Do support program 33a provides the following two functions to the JVM of the mobile terminal 10.

a. To Do Text Analysis Function

This is a function that, from a text string of To Do data displayed on the liquid crystal display 14, designates a partial text string with a spelling that matches an index associated with the telephone number and the email address in the table in the phonebook data storage area 18b.

b. Link Association Function

This is a function that associates a link for starting up the telephone call application program 17c or the mail application program 17d with the partial text string designated by the To Do text analysis function.

The download page data 33b is display control data in which the layout of a download page screen that prompts downloading of the To Do support program 33a is described with HTML.

Next is a description of the characteristic operation of this exemplary embodiment. The operation of this exemplary embodiment can be described by dividing the operation into a program delivery process and a To Do data browsing process.

Figure 6:
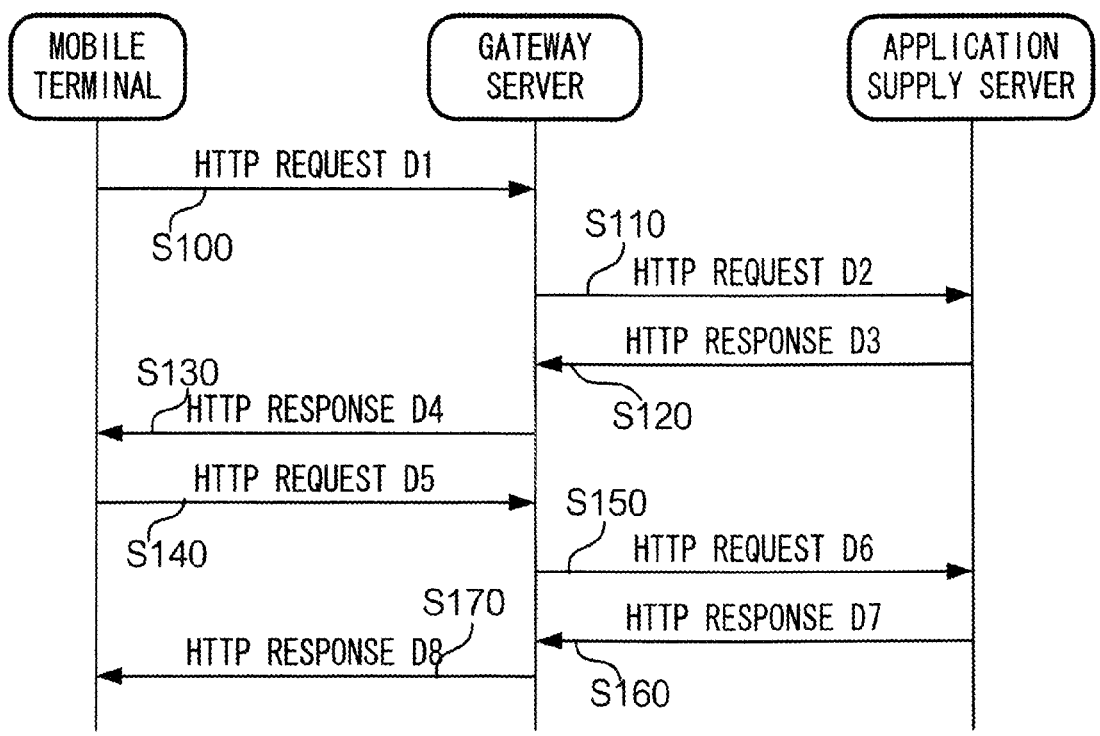
FIG. 6 is a flowchart that shows a program delivery process.

FIG. 6 is a flowchart that shows the program delivery process.

First, the user operates the input unit 13 of the mobile terminal 10 to start up the browser application program 17e. As a result, according to an operation signal supplied from the input unit 13, the CPU 15 starts up the browser application program 17e, and performs packet registration to the packet subscriber processing apparatus in the mobile packet communications network 20, described above. This packet registration is a registration procedure performed in order for the mobile terminal 10 to exchange packets with the mobile packet communications network 20. When packet registration is performed, the mobile terminal 10 is capable of exchanging packets with the gateway server 50.

Afterward, when the user performs input to the input unit 13 of the mobile terminal 10 that designates a URL of the download page data 33b of the To Do support program 33a, the CPU 15 of the mobile terminal 10 sends an HTTP request D1 that includes that URL to the mobile packet communications network 20 via the send/receive unit 12 (S100). The sent HTTP request D1 is received by the gateway server 50. Then, the gateway server 50 performs protocol conversion on the HTTP request D1, and forwards it as an HTTP request D2 to the Internet 40 (S110).

When the application supply server 30 receives the HTTP request D2, the application supply server 30 reads the download page data 33b from the storage area of the hard disk 33 indicated by the URL included in the HTTP request D2, and sends the read download page data 33b as a reply to the Internet 40 as an HTTP response D3 (S120). As a result, the HTTP response D3 is received by the gateway server 50, and forwarded to the mobile packet communications network 20 as an HTTP response D4 (S130).

The HTTP response D4 is received by the send/receive unit 12 of the mobile terminal 10. The CPU 15 of the mobile terminal 10 stores the received HTTP response D4 in the RAM 16, and displays a download page screen corresponding to the download page data 33b included in the HTTP response D4 on the liquid crystal display 14. In this screen, a message that prompts to download the To Do support program 33a and a confirmation button that instructs confirmation of that message are displayed.

In this state, when the user operates the input unit 13 to select the confirmation button, the CPU 15 sends an HTTP request D5 that includes an URL of the To Do support program 33a to the mobile packet communications network 20 via the send/receive unit 12 (S140).

After the HTTP request D5 sent by the mobile terminal 10 is received by the gateway server 50, and forwarded to the Internet 40 as an HTTP request D6 (S150), the HTTP request D6 is received by the application supply server 30. The application supply server 30 reads the To Do support program 33a from the storage area of the hard disk 33 indicated by the URL included in the received HTTP request D6, and sends that To Do support program 33a as a reply to the Internet 40 as an HTTP response D7 (S160). The HTTP response D7 is protocol-converted by the gateway server 50, and sent to the mobile terminal 10 as an HTTP response D8 (S170). After receiving the HTTP response D8, the mobile terminal 10 stores the To Do support program 33a included in the HTTP response D8 in the Java application storage area 18a of the EEPROM 18.

Figure 7:
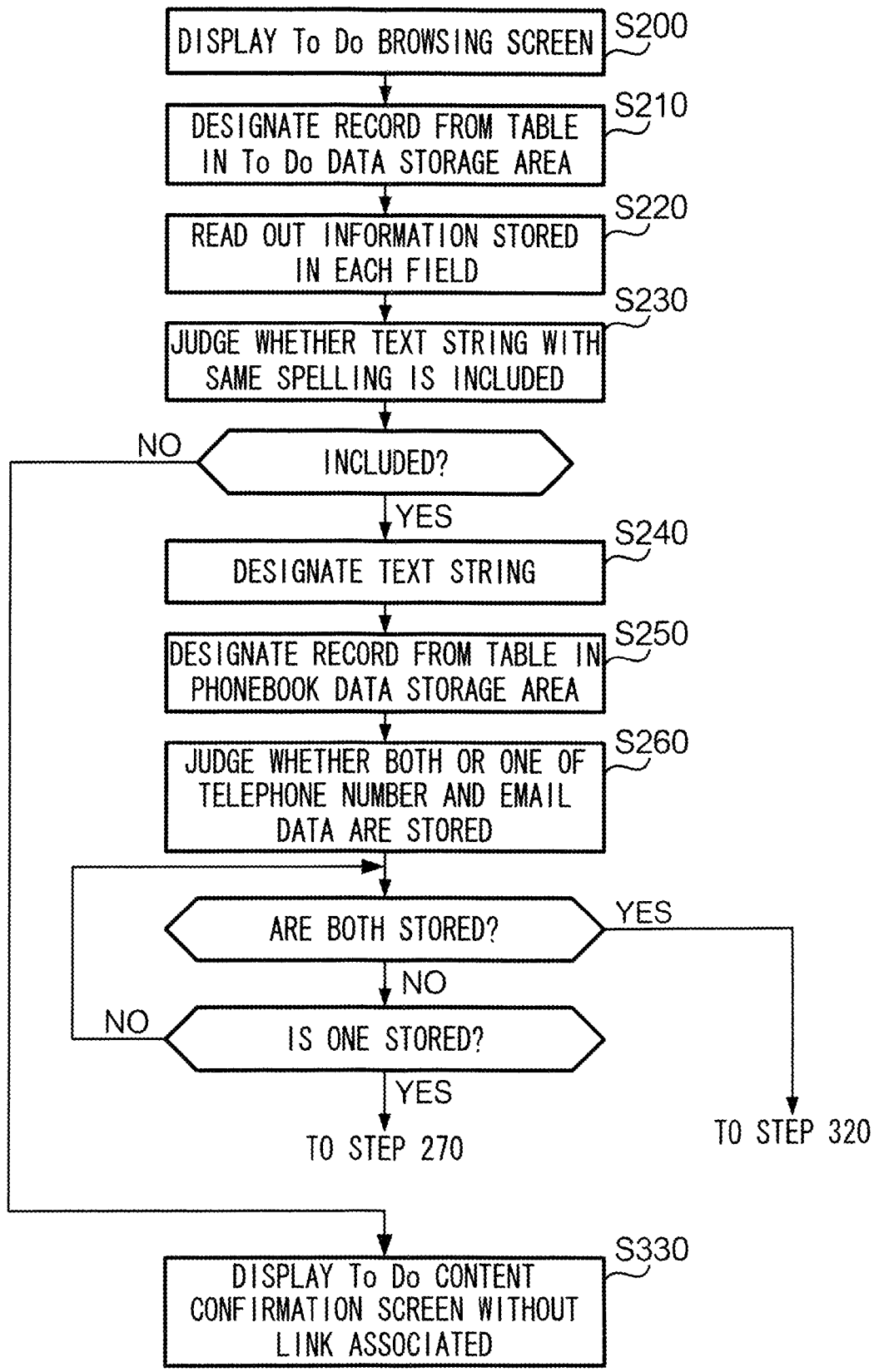
FIG. 7 is a flowchart that shows a To Do data browsing process (first half)
Figure 8:
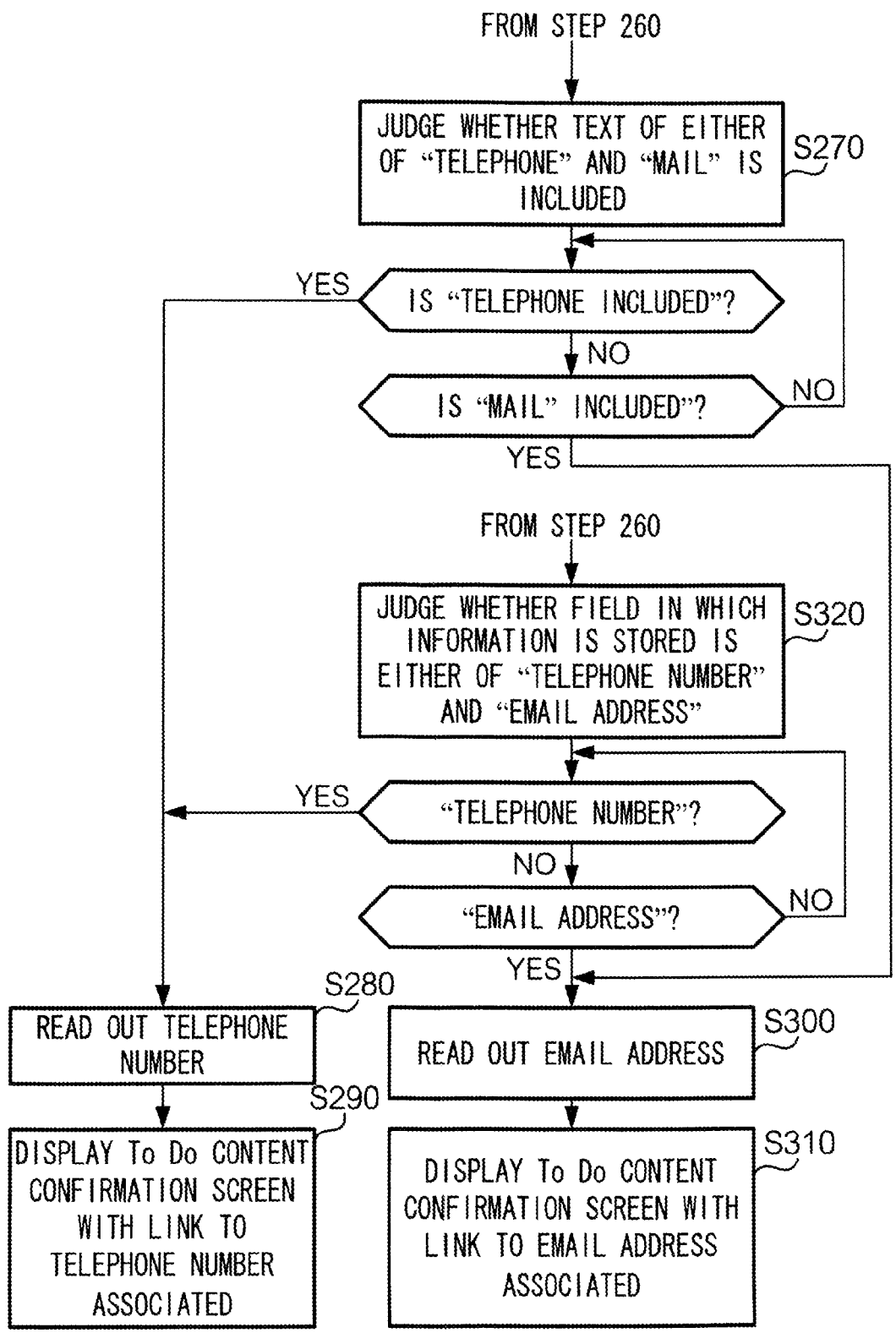
FIG. 8 is a flowchart that shows a To Do data browsing process (second half)

FIGS. 7 and 8 are flowcharts that show the To Do data browsing process. In a state in which the To Do support program 33a has already been started up, the user operates the input unit 13 of the mobile terminal 10 to start the process shown in FIGS. 7 and 8, with startup of the To Do management application program 17g as a trigger.

When the To Do management application program 17g is started up, the CPU 15 of the mobile terminal 10 displays a To Do browsing screen on the liquid crystal display 14 (S200).

Figure 9:
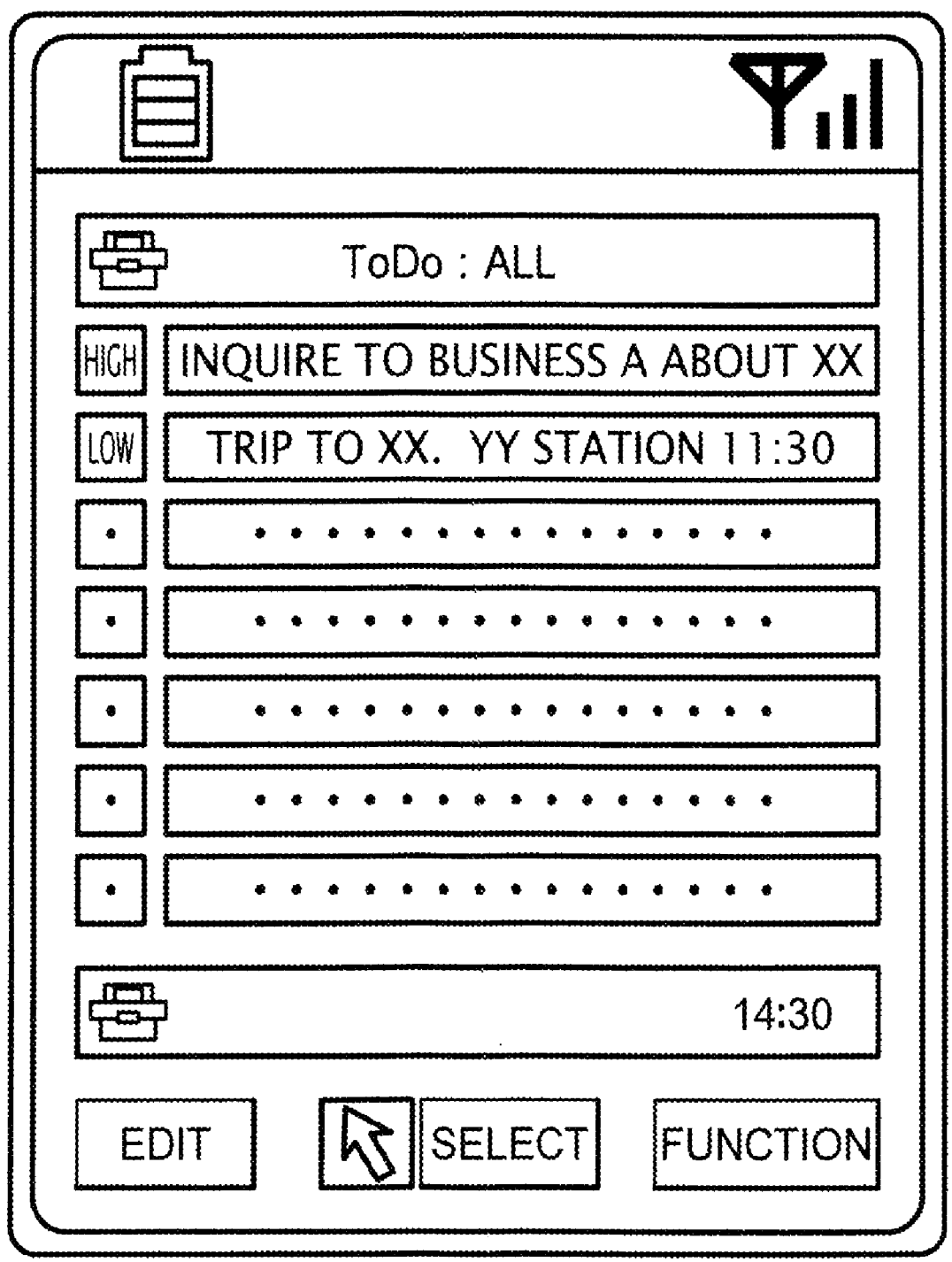
FIG. 9 shows a To Do browsing screen.

FIG. 9 shows the To Do browsing screen. In this screen, groups of the information stored in the "priority rank" field and the first fifteen characters of text written in the "activity content" field of each record in the To Do data storage area 18c are listed as list items. The user operates the input unit 13 to select, in a highlighted state, a list item of To Do data for which it is desired to confirm the detailed contents.

When any list item is selected, the CPU 15 of the mobile terminal 10 designates the record that corresponds to the selected list item from the table of the To Do data storage area 18c (S210).

The CPU 15 reads out, to the RAM 16, the information stored in each of the fields "activity content", "date", "priority level", "category", and "alarm notification" of the record designated in Step 210 (S220).

The CPU 15 judges whether or not a text string with the same spelling as the text string stored in the "index" of any record in the table in the phonebook data storage area 18b is included in the text string read out in Step 220 from the "activity content" field (S230).

When judged in Step 230 that a text string with the same spelling is included, the CPU 15 designates that text string (S240).

Furthermore, the CPU 15 designates the record in which the text string designated in Step 240 is written in the "index" field, from the table formed in the phonebook data storage area 18b (S250).

The CPU 15 judges whether information is stored in both of the fields "telephone number" and "email address" of the record designated in Step 250, or whether information in stored in only one of those fields (S260).

When judged in Step 260 that information is stored in both fields, the CPU 15 judges whether text of either "telephone" or "mail" is included in the text string expressed by the information read out in Step 220 (S270).

When the CPU 15 has judged in Step 270 that the text "telephone" is included, the CPU 15 reads out, to the RAM 16, the telephone number that was recorded in the "telephone number" field of the record designated in Step 250 (S280).

Next, the CPU 15 lays out the information read out from each field in Step 220, and displays, on the liquid crystal display 14, the To Do content confirmation screen in which the text string designated in Step 240 is associated with a link to the telephone number read out in Step 280 (S290).

Figure 10:
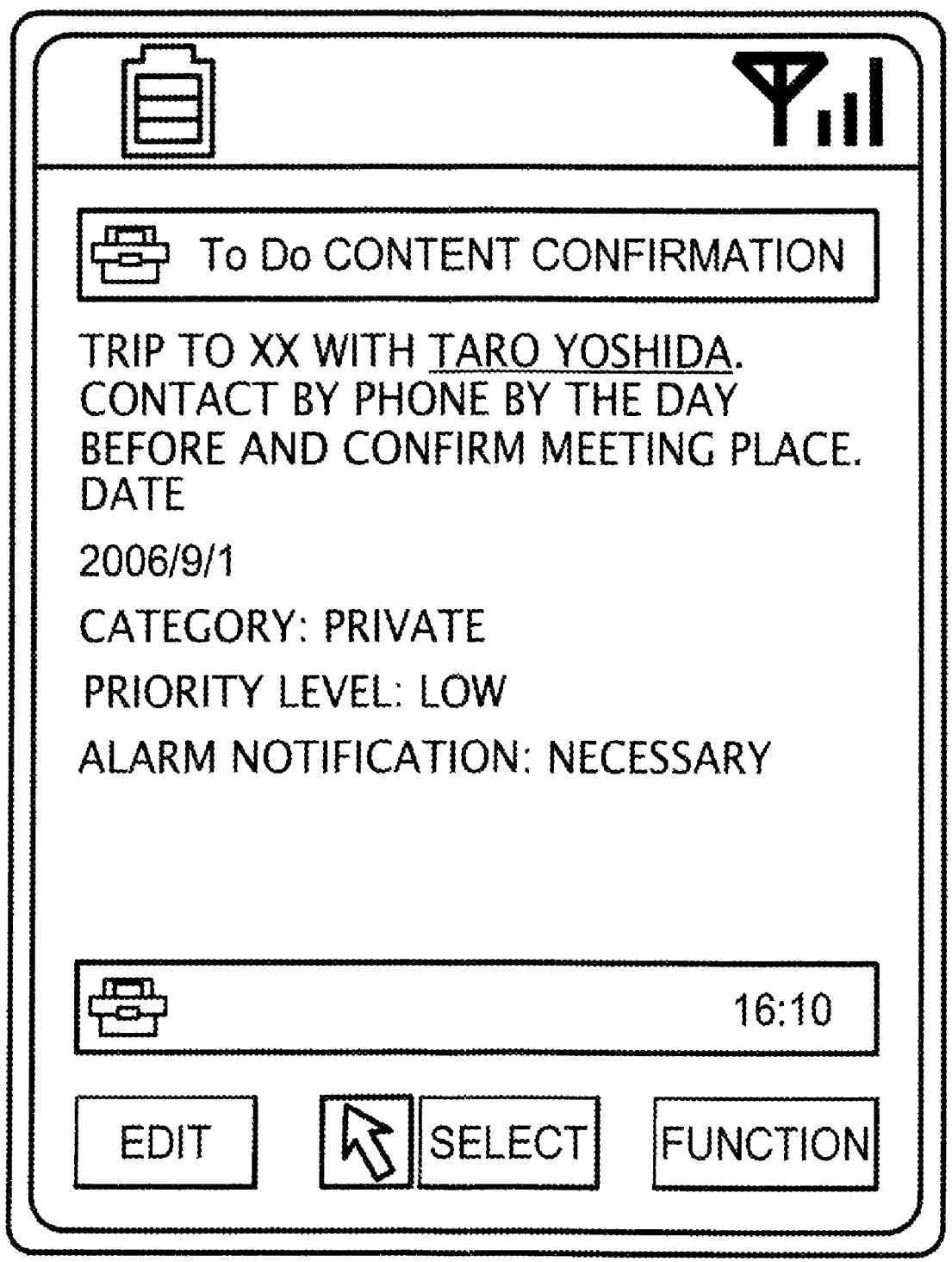
FIG. 10 shows an example of a To Do content confirmation screen.
Figure 11:
FIG. 11 shows an example of a calling screen.

FIG. 10 shows an example of the To Do content confirmation screen displayed according to Step 290. In the uppermost part of this screen, the text string stored in the "activity content" field, "Trip to XX with Taro Yoshida. Contact by phone by the day before and confirm meeting place.", is displayed, and below that text string, the information stored in each of the fields "date", "priority level", "category", and "alarm notification" is displayed. Here, when referring to the text string of activity contents in the uppermost part of the screen shown in FIG. 10, it is understood that included in that text string is the text string "Taro Yoshida" registered as an index (name) in the table in the phonebook data storage area 18b, and an underline is added to that text string that indicates association of a link to a telephone number. The reason for this is that because "telephone" is included in the text string that indicates the activity contents, the process has advanced to Step 280 after the judgment in Step 270. When the input unit 13 is operated to select a text string with a link associated, the telephone call application program 17c is immediately started up, and the display content of the liquid crystal display 14 switches to an input-complete calling screen using as a call recipient a telephone number stored in the phonebook data storage area 18b associated with that text string (FIG. 11).

When the CPU 15 has judged in Step 270 that the text "mail" is included, the CPU 15 reads out, to the RAM 16, the email address that was recorded in the "mail" field of the record designated in Step 250 (S300).

Next, the CPU 15 lays out the information read out from each field in Step 220, and displays, on the liquid crystal display 14, the To Do content confirmation screen in which the text string designated in Step 240 is associated with a link to the email address read out in Step 300 (S310).

Figure 12:
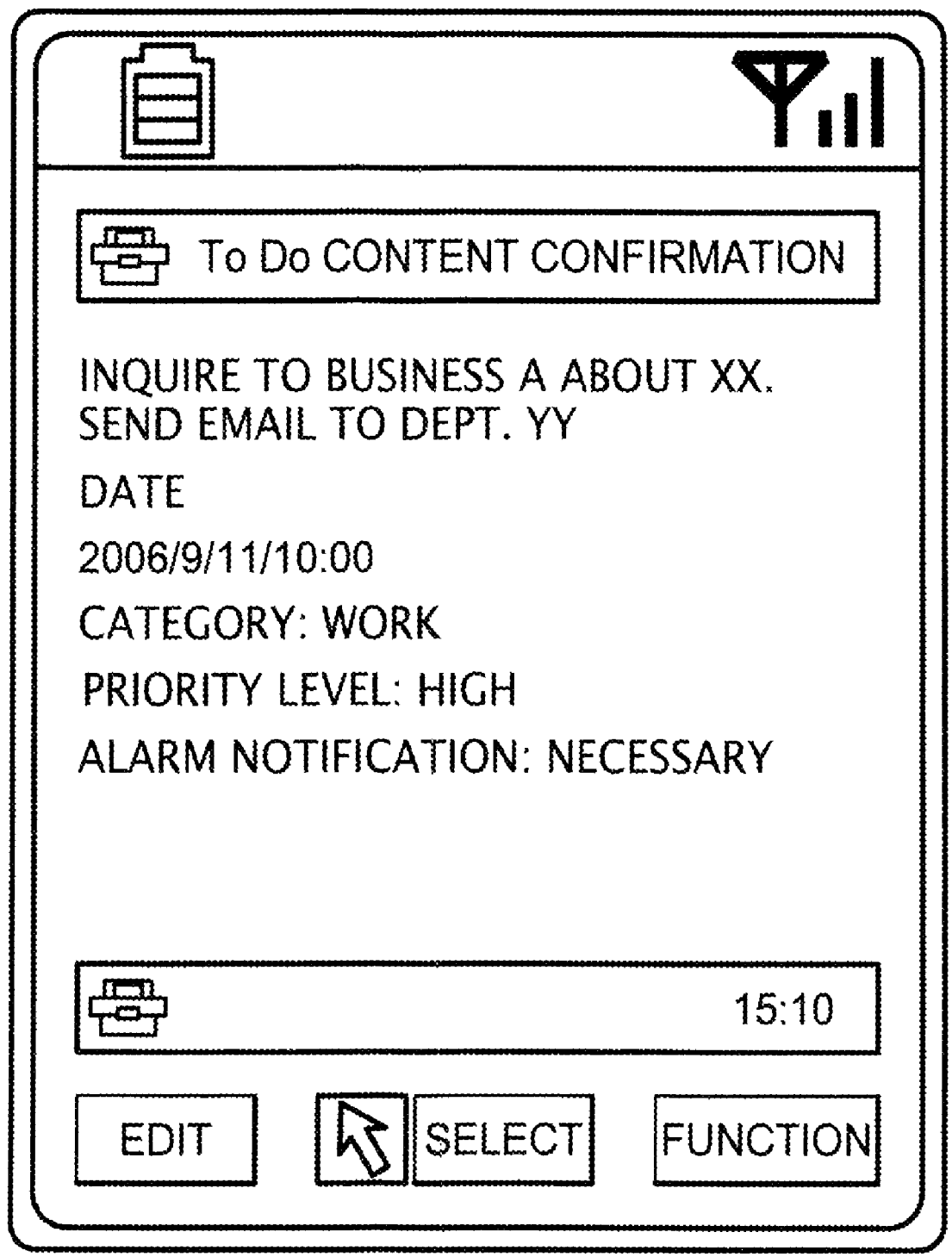
FIG. 12 shows an example of a To Do content confirmation screen.
Figure 13:
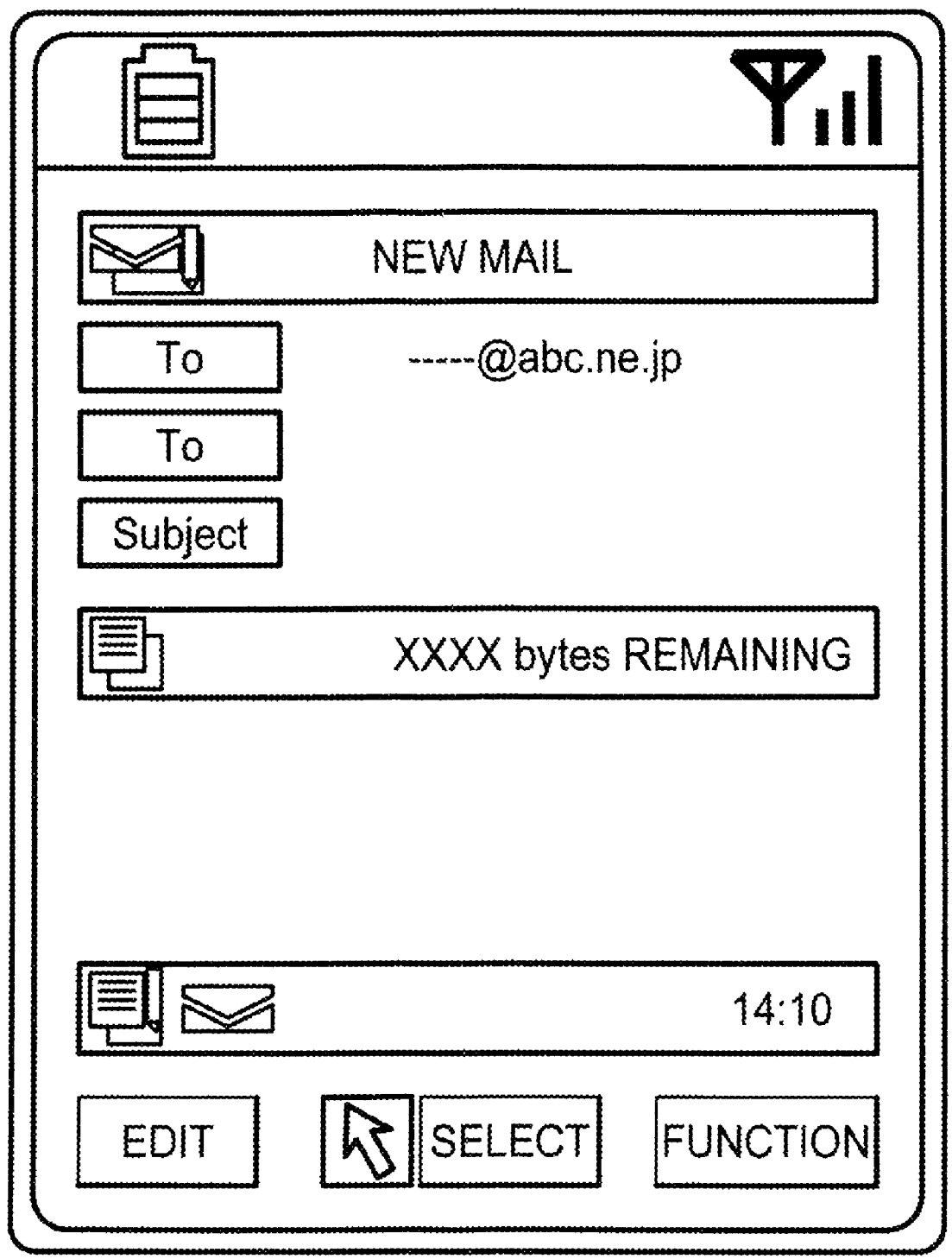
FIG. 13 shows an example of a new mail creation screen.

FIG. 12 shows an example of the To Do content confirmation screen displayed according to Step 310. In the uppermost part of this screen, a text string stored in the "activity contents" field, "Inquire to Business A about XX. Send email to Dept. YY", is displayed, and below that text string, the information stored in each of the fields "date", "priority level", "category", and "alarm notification" is displayed. Here, when referring to the text string of activity contents in the uppermost part of the screen shown in FIG. 12, it is understood that included in that text string is the text string "Business A" registered as an index (name) in the table in the phonebook data storage area 18b, and an underline is added to that text string that indicates association of a link to an email address. The reason for this is that because "mail" is included in the text string that indicates the activity contents, the process has advanced to Step 300 after the judgment in Step 270. When the input unit 13 is operated to select a text string with a link associated, the mail application program 17d is immediately started up, and the display content of the liquid crystal display 14 switches to an input-complete new mail creation screen using as the email address the address stored in the phonebook data storage area 18b associated with that text string (FIG. 13).

When judged in Step 260 that information is only stored in one field, the CPU 15 judges whether the field in which information has been stored is "telephone number" or "email address" (S320).

When judged in Step 320 that information is stored in the "telephone number" field, the CPU 15 executes the process from Step 280 onward. As a result, a To Do content confirmation screen in which a link to a telephone number has been associated with a partial text string, as shown in FIG. 10, is displayed on the liquid crystal display 14.

When judged in Step 320 that information is stored in the "email address" field, the CPU 15 executes the process from Step 300 onward. As a result, a To Do content confirmation screen in which a link to an email address has been associated with a partial text string, as shown in FIG. 12, is displayed on the liquid crystal display 14.

On the other hand, when judged in Step 230 in FIG. 7 that a text string with the same spelling is not included, the CPU 15 displays on the liquid crystal display 14 a To Do content confirmation screen in which a link to a telephone number or an email address is not associated with any text string (S330).

In the mobile terminal 10 according to the exemplary embodiment described above, when any list item in the To Do browsing screen is selected, text of the To Do data for that list item is displayed on the liquid crystal display 14 as the To Do content confirmation screen, and further, when a text string that is an index of a telephone number or an email address is included in the phonebook data storage area 18b, a link is associated with that telephone number or email address. Thus, the user can complete the registered activity without being forced to perform a troublesome operation of, after again starting up the telephone call application program 17c or the mail application program 17d, inputting the telephone number or the email address displayed in the To Do content confirmation screen character by character, or searching for that telephone number or email address in the table of the phonebook data storage area 18b.

Various modified exemplary embodiments of the invention are possible.

The invention is not limited to the mobile terminal described in the above exemplary embodiment, and is applicable to any communications terminal that performs communications.

Also, in the above exemplary embodiment, the To Do support program 33a that provides a characteristic function in that exemplary embodiment is stored on the hard disk 33 of the application supply server 30 on the Internet 40 as one Java application program, and is downloaded in response to a request from the mobile terminal 10. However, a program that provides the same function as the To Do support program 33a to the mobile terminal 10 may be stored in the ROM 17 of the mobile terminal 10 as a pre-installed program. This program may also be supplied to the mobile terminal in a state of being recorded on a computer-readable recording medium such as a magnetic recording medium (such as magnetic tape, a magnetic disk (HDD (Hard Disk Drive), or an FD (Flexible Disk)), an optical recording medium (such as an optical disk (CD (Compact Disk) or a DVD (Digital Versatile Disk)), a magneto-optical recording medium, or a semiconductor memory (such as a flash ROM), or this program may be supplied to the mobile terminal via a network such as the Internet.

The phonebook data stored in the phonebook data storage area 18b is not limited to being produced by the phonebook management application program 17f. For example, phonebook data produced and kept on a mobile packet communications network or an Internet may be downloaded by the mobile terminal and stored in the phonebook data storage area 18b. Also, when a communications recipient is a business or the like, a communications address (phonebook data) can be obtained by performing a robot search on the Internet using the business name as a search key, so a communications address obtained in that manner may also be stored in the phonebook data storage area 18b. Also, the communications address is not limited to being a telephone number or a mail address, and may be any communications address that has been assigned to a communications terminal and can be used to communicate with that communications terminal.

In the above exemplary embodiment, the text string in which a link to a telephone number and an email address is associated by receiving operation of the To Do support program 33a is only a text string that makes up To Do data created by the To Do management application program 17g, but the same manner of link may also be associated in a text string that makes up data edited by another application program (edited data). For example, in recent portable telephones, it is common to implement a PIM (Personal Information Manager) application that combines the above-described phonebook management application program 17f and the To Do management application program 17g, as well as a memo management application that manages memos written by the user. Thus, when displaying memo data that has been edited by the PIM application, a link to a telephone number and an email address may be associated with a text string that is a part of that memo data.

What is claimed is:

1. A communications terminal comprising:
a display;
a first storage unit that stores data including a text string;
a second storage unit separate and distinct from the first storage unit, the second storage unit stores a first information set and a second information set, the first information set including a first communications address for contacting people other than a user of the telecommunications terminal and a name of a communications recipient indicated in the first communications address, and the second information set including a second communications address for contacting the people other than the user of the telecommunications terminal and a name of a communications recipient indicated in the second communications address;
a first display controller that displays, on the display, a text string expressed by data stored in the first storage unit; and
a second display controller that, among names stored in the second storage unit, identifies a name included in the text string displayed by the first display controller, and when the identified name is associated with the first communications address, the second controller displays on the display a screen prompting communications to the first communications address, or when the identified name is associated with the second communications address, displays a screen prompting communications to the second communications address,
wherein:
when the identified name is associated with both the first communications address and the second communications address, the second display controller determines whether the text string displayed by the first display controller includes a first related text string or a second related text string, the first and second related text strings being words representative of communications performed by the first and the second communications addresses, respectively; and
when the first related text string is included, the second display controller displays a screen prompting communications using the first communications address, and when the second related text string is included, the second display controller displays a screen prompting communications using the second communications address; and
said screen prompting communication using the first communications address includes a first link for executing a first application for communicating with the first communication address, and said screen prompting communication using the second communications address includes a second link for executing a second application for communicating with the second communication address further wherein the second display controller is separate and distinct from the first display controller.

2. The communications terminal according to claim 1, further comprising an input unit, wherein:

the second display controller changes an appearance of the identified name being displayed, so as to notify a link to the first communications address or the second communications address; and when the displayed name which the appearance is changed is selected via the input unit, the second display controller displays on the display a screen prompting communications using the first communications address or displays a screen prompting communications using the second communications address, respectively.

3. The communications terminal according to claim 1, wherein the first communications address is a telephone number, and the second communications address is an email address.

4. A non-transitory computer readable storing medium that stores a computer program that causes a computer to execute specified steps, the computer including a display, a first storage unit that stores data that includes a text string, a second storage unit that is separate and distinct from the first storage unit and stores a first and second set of information, the first set of information including a first communications address for contacting people other than a user of the telecommunications terminal and a name of a communications recipient indicated by the communications address, and the second set of information including a second communications address for contacting the people other than the user of the telecommunications terminal and a name of a communications recipient indicated by that communications address, a first display controller; and a second display controller that is separate and distinct from the first display controller, the specified steps comprising:

displaying, on the display, a text string expressed by data stored in the first storage unit;

identifying from among names stored in the second storage unit a name included in the displayed text string; and when the identified name is associated with the first communications address, displaying on the display a screen prompting communications to the first communications address, or when the identified name is associated with the second communications address, displaying a screen prompting communications to the second communications address, wherein:

when the identified name is associated with both the first communications address and the second communications address, the second display controller determines whether the text string displayed by the first display controller includes a first related text string or a second related text string, the first and second related text strings being words representative of communications performed by the first and the second communications addresses, respectively; and when the first related text string is included, the second display controller displays a screen prompting communications using the first communications address, and when the second related text string is included, the second display controller displays a screen prompting communications using the second communications address; and said screen prompting communication using the first communications address includes a first link for executing a first application for communicating with the first communication address, and said screen prompting communication using the second communications address includes a second link for executing a second application for communicating with the second communication address.

\* \* \* \* \*